UNITED STATES PATENT OFFICE.

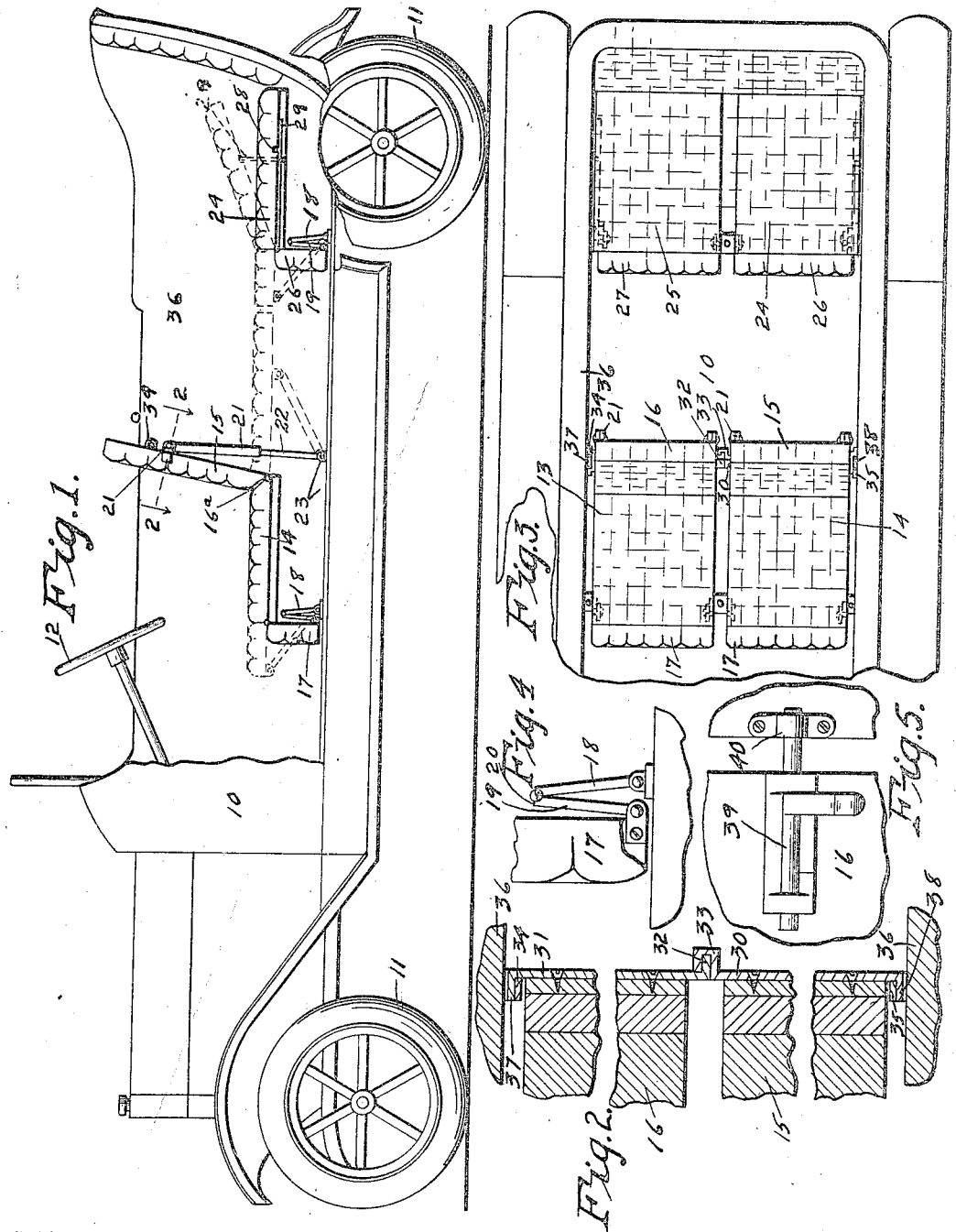

MAX ZIEHLKE, OF JEFFERSON, IOWA.

AUTOMOBILE AMBULANCE.

1,210,749.   Specification of Letters Patent.   Patented Jan. 2, 1917.

Application filed August 24, 1914. Serial No. 858,320.

*To all whom it may concern:*

Be it known that I, MAX ZIEHLKE, a citizen of the United States, residing at Jefferson, in the county of Greene and State of Iowa, have invented a certain new and useful Automobile Ambulance, of which the following is a specification.

The object of my invention is to provide an automobile ambulance of simple, durable and inexpensive construction, so constructed and arranged that the car may be used for ordinary pleasure or business driving or may be readily and easily converted into an ambulance without interfering with the driver's seat or may be readily and easily converted into a sleeping car.

Still a further object is to provide such an automobile ambulance in which the parts forming the bed are of such construction as to make a bed of proper length.

Still a further object is to provide such a device in which a portion of the bed cushions may be raised to serve as a pillow.

Still a further object is to provide such a device so constructed that the seats shall have rigidity when used in the ordinary way.

My invention consists, in certain details, in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of an automobile ambulance embodying my invention, the side of the body being broken away to show the arrangement of the seats and cushions. Fig. 2 shows a detail sectional view, taken on the line 2—2 of Fig. 1. Fig. 3 shows a top or plan view of a portion of the machine showing the arrangement of the seats. Figs. 4 and 5 show detail views of parts of the mechanism.

In the accompanying drawing I have used the reference numeral 10 to indicate the body of an ordinary automobile adapted to carry four or more passengers. The machine is mounted on the wheels 11 and has an ordinary steering wheel 12.

The machine is provided with front and rear seats. The front seat has the cushions 13 and 14, so divided as to make the seats separate. The upright back members 15 and 16 of the front seat are also separated from each other and are hinged to the seat portions 14 and 13 at 16ª. Hinged to the front of the frames which support the cushions 14 and 15 are cushions 17, which normally hang downwardly as shown by the full lines in Fig. 1.

Secured to the floor of the machine beneath the front seat are levers 18. Similar levers 19 are hinged to the lower ends of the members 18, as shown in Fig. 4. The levers 18 and 19 are provided with shoulders 20, so arranged as to engage each other when the levers are moved to a position in alinement with each other, which occurs when the members 17 are raised to horizontal position, as shown by the dotted lines in Fig. 1.

Pivoted to the upper rear portions of the frames which support the cushions 15 and 16 are tubular arms 21. Rods 22 are pivoted to the floor beneath the rear portion of the front seat, as shown in Fig. 1, and are arranged with their upper ends telescopically received in the tubular arms 21. The parts just described are so arranged that when the seat members 15 and 16 are tilted downwardly and rearwardly to horizontal position, as shown by the dotted lines in Fig. 1, the lower ends of the members 21 engage the brackets 23 by which the members 22 are pivoted to the floor of the machine for holding said seat members 15 and 16 against movement below their horizontal position.

The back seat cushions are arranged in pairs indicated by the reference characters 24 and 25, similar to the seat members 13 and 14. Pivoted to the front ends of the seat members 24 and 25 are seat members 26 and 27, which normally hang downwardly, as shown by the full lines in Fig. 1. Seat members 26 and 27 are connected with the floor of the machine by levers 18 and 19, similar to those already described, as connected with the seat members 17, and are adapted to hold the seat members 25 and 26 in position when they are raised, as shown by the dotted lines in Fig. 1. The seat members 24 and 25 are pivoted at their forward ends to permit the rearward ends of said seat members to be tilted upwardly, as illustrated by dotted lines in said Fig. 1. The frames of the seat members 24 and 25 are provided with transverse grooves 28 on their under sides.

Pivoted to the frame of the machine beneath the seat members 24 and 25 are arms 29, which may lie flat on the frame beneath the seat members 24 and 25, but which are also adapted when said seat members are tilted upwardly to be raised to vertical positions with their upper ends received in the grooves 28 for supporting said seat members in their raised positions, as illustrated by dotted lines in said Fig. 1.

Secured to the backs of the seat members 15 and 16 are transverse bars 30 and 31. Bar 31 is provided at its end adjacent to the bar 30 with a rearwardly extending end 32, which is designed when the said seat members are in their ordinary raised positions, to be received in a socket or channel 33, formed on the end of the bar 30 adjacent to the bar 31. The channel or socket 33 is adapted to receive and engage the rearwardly extending end 32 for holding the bars 30 and 31 against longitudinal movement with relation to each other.

Suitably mounted on the frame of the machine adjacent to the outer sides of the seat members 15 and 16 are upright bars 34 and 35, which are spaced somewhat from the side walls 3? of the body of the chassis. Formed on the outer ends of the bars 30 and 31 are forward extensions 37 and 38, adapted, when the seat members 15 and 16 are raised, to be received between the members 34 and 35 and the side members 36. The parts just described are designed to give a rigid lateral bracing to the backs of the front seats to prevent lateral spreading thereof.

To lock the seat members 15 and 16 against tilting rearwardly under ordinary conditions, the backs of said seat members are provided with locking bolts 39, adapted in one position of their sliding movement, to have their ends received by keepers 40 on the side frame members 36.

In the practical use of my improved automobile ambulance, the seats may be used in their ordinary positions when desired. When however it is desired to use the machine as an ambulance, the driver's seat is left in its normal position. For the purpose of illustration I shall call the seat 13 the driver's seat. The seat member 17 may be raised until the levers 18 and 19 lock and the seat member 15 may be lowered until the arm 21 engages the bracket 23 when the seat member 15 will be supported in its horizontal position, as shown by the dotted lines in Fig. 1. The seat member 17 may then be raised to horizontal position, as shown by dotted lines in said figure. The seat member 24 may be left in its ordinary position or may be raised as shown by the dotted lines in Fig. 1, until the arms 29 can be raised to position with their upper ends received in the notch 28 in the back or lower surface of said seat member 24.

I am aware that devices have been worked out for using the seats of an automobile for sleeping purposes, but I desire to provide a device capable of being adapted for use not only for sleeping purposes but also for forming an ambulance of such construction as to furnish a bed for a sick or injured person without interfering with the driver's seat.

From my investigation of the use of automobile seats for sleeping purposes, I have come to the conclusion that only the ordinary cushions are used and that the beds made with the ordinary cushions are too short for comfortable sleeping purposes, and have therefore provided the members 17, 26 and 27 with their construction and means for adjustment as shown in the drawing, and described herein, whereby said members are used in connection with the other seat members, and a bed of sufficient length is provided. The construction of the parts 31 and 30 and the parts connected therewith is such as to prevent lateral spreading of the back portions of the front seat when said back seats are in their ordinary raised positions.

The movable members of my device are of comparatively simple and inexpensive construction. The means for supporting the movable seat members may be made at a comparatively small price and with a minimum of material. None of the movable parts are in the way of the driver or passengers when the automobile is used for ordinary pleasure or business purposes.

It will be understood that some changes may be made in the details of the construction of my improved automobile ambulance and it is my intention to cover by this application any such changes as may be included within the scope of the appended claim.

I claim as my invention:

In an ambulance, a vehicle having two front seats, one of said front seats having a seat cushioned member, a hinged downwardly depending cushioned member at the forward end of the seat member, means for securing said downwardly depending member in horizontal position, a back member arranged in hinged relation with said seat member and adapted to swing rearwardly and downwardly to horizontal position, a telescoping device connected with said back member and the floor of the vehicle, the parts thereof being arranged so that their collapsing movement is limited to position where said back member is horizontal, a bar secured to said back member having at its ends forward extensions, means on said vehicle arranged to overlap said forward extensions on the sides thereof adjacent to said back member when the back member is raised, so that said bar tends to hold the parts of the machine from spreading laterally.

Des Moines, Iowa, August 4, 1914.

MAX ZIEHLKE.

Witnesses:
F. R. HARDING,
F. G. COLBY.